Patented Oct. 28, 1947

2,429,957

UNITED STATES PATENT OFFICE 2,429,957

FIRE-RESISTING AND MOISTUREPROOF PAINT AND METHOD OF MAKING

Orazio La Cagnina, St. Albans, N. Y., assignor to Bartolo Castellana, Elizabeth La Cagnina, Ignazio Villano, Paul Castellana, and Salvatore Dalessandro No Drawing. Application December 22, 1943, Serial No. 515,292

7 Claims. (Cl. 106—81)

This invention relates to fire proof and moisture proof paints, to the methods of making the paints, and to the method of applying successive coats of these paints for giving protection against fire, or protection against fire and moisture, as may be desired.

All of the paints of this invention contain, as an essential ingredient, sodium silicate. With the sodium silicate is combined certain mineral pigments and also other ingredients, such as oil, glycerin, lacquer, and the like, in varying proportions and by special methods of blending and mixing, to produce the several types of silicate paints forming the subject matter of this invention.

By varying the proportions of the ingredients, the fire resisting qualities, the moisture resisting qualities, and the viscosity, of the several paints may be varied as is understood by those skilled in this art, and as will be described.

This invention comprises the following vehicles, pigments and paints, which at this point of the description are only described in a general way. Since frequent reference will be made herein to particular paint vehicles, pigment compositions, and paints, such compositions, in the interest of clarity and brevity, will be given names, which appear in quotation marks.

*"Fire stop vehicle #1"—"Fire stop vehicle #2 clear"*

Vehicle #1 consists essentially of a solution of sodium silicate in water, combined with dust asbestos, glycerin and lacquer. After mixing, as will be described, it is allowed to set for two days. Then the upper portion, say the top one-eighth, is drawn off, and this part drawn off forms "Fire stop vehicle #2 clear."

*"Fire stop pigment #1"—"Fire stop pigment #2"*

These pigments are finely divided mineral pigments, which are combined, together with other ingredients, as will be described, to make the several paints described below. In some cases, these two pigments are used separately, in other cases the two pigments are mixed with each other.

*"Fire stop paint #1"*

This paint consists essentially of "Fire stop pigment #1," a little linseed or China-wood or similar oil, and "Fire stop vehicle #1," mixed as will be described, to give a fire proof paint. In use, a priming or sizing coat is preferably first applied to the metal, wood or other surface being treated, and then two coats of "Fire stop paint #1" applied. These two coats of "Fire stop paint #1" give very good fire proof protection and no other coats need be used. However, these two coats are not sufficiently moisture resistant for outdoor use, although they are washable. For outdoor use, the following additional coats are applied, namely a "sealing" coat of gum lacquer dissolved in alcohol, followed by two coats of the "Weather proof paint #1" or #2, now to be described.

*"Weather proof paint #1, lacquer base"*

This paint consists essentially of "Fire stop vehicle #2 clear," "Fire stop pigments #1 and #2," glycerin and lacquer. This is applied on the "sealing coat" just described.

*"Weather proof paint #2, lacquer base"*

This paint is similar to "Weather proof paint #1" above, containing, however, less of Vehicle #2 clear, more lacquer and "Fire stop pigment #2." It is applied on "Weather proof paint #1, lacquer base" above.

Instead of the two lacquer base weather proof paints just described, the following two oil base weather proof paints may be used, being applied to the sealing coat, which in turn and as described, is applied on the second coat of "Fire stop paint #1."

*"Weather proof paint #1A, oil base"*

This paint is made of oil, varnish, glycerin, "Fire stop vehicle #2 clear" and "Fire stop pigment #2," combined as described later.

*"Weather proof paint #2A, oil base"*

This paint is made of oil, varnish, glycerin, "Fire stop vehicle #2 clear" and "Fire stop pigment #2," combined as described later. This paint is applied on "Weather proof paint #1A, oil base."

*White paint or light colors*

A white or light colored paint may be made by combining "Fire stop pigment #2," linseed or China-wood oil, and "Fire stop vehicle #2 clear," as will be described.

*Priming coat for metal*

While a priming coat is not essential, it is desirable. A suitable priming coat for metal is made by combining certain of the pigments of "Fire stop pigment #1" with "Fire stop vehicle #1."

Priming coat for wood or similar soft or porous surfaces

A suitable priming coat for such surfaces is made by diluting "Fire stop vehicle #1" with boiling water, and then mixing with the pigments.

Putty

A fire stop putty may be be made by mixing "Fire stop pigment #1" with either "Fire stop vehicle #1" or "#2 clear" until a mass of the consistency of putty is obtained.

Those skilled in the art will, of course, understand that the proportions of the ingredients may be varied according to whether a thick or thin paint is desired. That is to say, where a paint for spraying is desired, which calls for a thinner paint, this is readily obtained by increasing the amount of vehicle.

To summarize the foregoing, complete fire and moisture proof protection for wood, metal or other surfaces comprises the following steps:
1. Apply the priming or sizing coat.
2. Apply first coat of "Fire stop paint #1."
3. Apply second coat of "Fire stop paint #1."
4. Apply a sealing coat.
5. Apply "Weather proof paint #1 or 1A," lacquer or oil base.
6. Apply "Weather proof paint #2 or 2A," lacquer or oil base.

The manner of compounding and mixing the several vehicles, pigments and paints, referred to in a general way above, will now be described in detail.

"Fire stop vehicle #1"

| | Gallons |
|---|---|
| Sodium silicate, partially saturated water solution, 38° Bé | 9 |
| Boiling hot water | 3 |

The hot water is thoroughly stirred into the silicate and the solution cooled.

| | Gallons |
|---|---|
| Glycerine | ¼ |
| Nitrocellulose base lacquer | ¾ |
| Dust asbestos, very fine impalpable powder (350 mesh and finer), enough to make a paste, with the glycerine and lacquer. | |

The glycerine and lacquer are mixed, and then the dust asbestos is gradually added with thorough mixing, sufficient to make a paste. This paste is then mixed with the sodium silicate solution. These ingredients may also be mixed by taking some of the dust asbestos and making a second paste with some of the sodium silicate solution, mixing this second paste with the first paste, then adding the remainder of the sodium silicate solution. This mixing is effected gradually and thoroughly in a suitable mill or mixer, or it may be done by working and pressing the ingredients through a 200 mesh screen. After mixing, it is allowed to set for two days. Before using, it should be well stirred or shaken. This gives "Fire stop vehicle #1," used in making the several paints, as will be described. It may be used in its entirety, or the upper part may be decanted off, to make "Fire stop vehicle #2," now to be described.

"Fire stop vehicle #2, clear"

After a few days, "Fire stop vehicle #1" settles somewhat. The top part may now be separated, if desired, by taking off say 2 gallons, more or less (approximately the upper one-eighth), to give "Fire stop vehicle #2 clear," for use in making the four weather proof paints, and in making white paint, as will be described.

"Fire stop pigment #1"

| | Pounds |
|---|---|
| Pigment #1, asbestos, 325 mesh | 25 |
| Pigment #2, asbestine, 325 mesh | 25 |
| Pigment #3, powdered mica, 250 mesh | 15 |
| Pigment #4, powdered mica, 100 mesh | 15 |
| Pigment #5, kaolin, 325 mesh | 10 |
| Pigment #6, silica, 325 mesh | 5 |
| Pigment #7, bentonite, 325 mesh | 5 |
| Pigment #8, zinc oxide, 325 mesh | 7½ |
| Pigment #9, inert mineral pigments, 325–350 mesh | 7½ |
| Pigment #10, talc, 325 mesh | 5 |
| Total | 120 |

The above fire resisting mineral pigments are thoroughly mixed, together with any mineral color pigments necessary or desired to give a particular shade of paint. These pigments are inert mineral pigments having similar properties and some could be omitted and replaced by others. For best results, however, all should be used. The term "inert mineral pigments" as used herein means mineral pigments of the type numbered 1 thru 8 and 10, in the above table.

These mixed pigments form "Fire stop pigment #1."

In the foregoing list of pigments, all are fireproof, mineral pigments; according to their respective properties, these pigments additionally impart the following properties to the mixed pigments and to the resulting paint: good covering power, good volume, good body and good set. They make a mixture in which the various ingredients are cemented or bound together in the paint coat, as with a binder.

"Fire stop pigment #2"

| | Pounds |
|---|---|
| Pigment #5, kaolin, 325 mesh | 5 |
| Pigment #8, zinc oxide, 325 mesh | 6¼ |
| Pigment #9, inert mineral pigments, 325–350 mesh | 6¼ |
| Pigment #11, special enamel powder (described below) 350 mesh | 7½ |
| Total | 25 |

Pigment #11, referred to above, consists of one part white barytes, 325 mesh, water floated; two parts zinc oxide, 325 mesh and one part amorphous silica, 350 mesh; these pigments are thoroughly mixed and enough water added to give a putty-like mass. This putty-like mass is broken up, dried on a wood surface, at say about 70° F. When thoroughly dried, it is ground to 350 mesh. This is "Pigment #11, special enamel powder," referred to above.

The above pigments #5, #8, #9 and #11, are thoroughly mixed and form "Fire stop pigment #2," for use in white paint and in the lacquer base and oil base weather proof paints to be described later. Where particular colors are desired, appropriate mineral color pigments are added, as is usual in this art.

"Fire stop paint #1"

To 120 lbs. of "Fire stop pigment #1," linseed, China-wood or similar oil is added in the form of a shower, with gradual and thorough mixing, until the pigment has a "moist" or "damp" feel, although, of course, no water is present. For 120 lbs. of pigment about 2½ gallons of oil is sufficient; for 100 lbs. of pigment, about 2 gallons of oil is sufficient.

Then the oil-treated pigment is mixed with "Fire stop vehicle #1," in about these proportions:

Oil treated "Fire stop pigment #1" _____ pounds__ 100
"Fire stop vehicle #1" _____ gallons__ 12

If 13 gallons of vehicle #1 is used, about 108 lbs. of #1 pigment would be used.

These ingredients are gradually and thoroughly mixed in a suitable mill or mixer, and when so mixed form a fire proof paint, which I call "Fire stop paint #1."

All pigments used in the fire stop paint should be mineral pigments. Suitable colors may be obtained by the use of appropriate pigments, provided mineral pigments are used.

This paint should be passed through a screen of about 200 mesh before being put into cans or kegs. Prior to using, it should, of course, be well stirred.

The thickness of the paint may be varied by changing the proportions of pigment and vehicle. The above proportions are about right for brushing. For spraying, about 15% less pigment, that is, about 85 lbs. of pigment, would be used.

In use, the surface should be treated with a suitable priming or sizing coat, after which one coat or "Fire stop paint #1" is applied and allowed to dry, which takes about 2 to 3 hours. This fire proof paint is washable. Then a second coat is preferably applied and dried for 4 or 5 hours. This gives two fire proof paint layers entirely suitable for indoor or dry conditions. For outdoor use, the second coat should be allowed to dry for about two days and a "sealing coat" then applied, this coat being made by dissolving 1 pint of gum lacquer in 1 gallon of alcohol. While this sealing coat could be omitted, it is preferred that it be used, as it serves to prevent chemical interaction between the fire proof coat, and the moisture proof coat, which is applied next.

"Weather proof paint #1, lacquer base"

| | Pounds |
|---|---|
| "Fire stop pigment #1" | 5 |
| "Fire stop pigment #2" | 2 |

These pigments are well mixed.

Glycerine _____ 1/20 (5%) gal.
Nitrocellulose base lacquer _____ 3/20 (15%) gal.

The lacquer and glycerine are well mixed, and then enough of the mixed pigments are gradually and thoroughly mixed to the consistency of a paste. To this paste is added:

"Fire stop vehicle #2, clear" ____ 16/20 (80%) gal.

This vehicle and paste are thoroughly mixed in a suitable mixer, and then the remainder of the 7 lbs. of mixed pigments thoroughly mixed in, to give "Weather proof paint #1, lacquer base." The paint is next put through a 200 mesh screen, and packaged. This paint is fire resisting and may be used by itself as such, but preferably it is applied to the "sealing layer," which in turn is applied over two coats of "Fire stop paint #1," as already described, and followed by "Weather proof paint #2, lacquer base," now to be described.

"Weather proof paint #2, lacquer base"

"Fire stop pigment #2" _____ 7 lbs.
Glycerine _____ 1/20 (5%) gal.
"Fire stop vehicle #2 clear" _____ 3/20 (15%) gal.

The glycerine and vehicle are well mixed and then part of the "Fire stop pigment #2" added, enough to give a paste. To this paste is added:

Nitrocellulose base lacquer _____ 16/20 (80%) gal.

After the lacquer is thoroughly mixed with the paste, then the remainder of the pigment is added. The paint is put through a 200 mesh screen before packaging.

Comparing the two foregoing examples, it will be noted that the amounts of lacquer, and vehicle #2, are reversed in the two paints. In paint #1, the lacquer is to vehicle as 3:16. In paint #2, the lacquer is to vehicle as 16:3. This gives "Weather proof paint #2, lacquer base," which is also fire resisting, which is applied on "Weather proof paint #1, lacquer base" described above, to complete the several layers for complete fire proof and moisture proof protection. This paint, before using, may be thinned with commercial "lacquer thin," as desired. This is the final coat, and it may be Simonized for a glossy finish, if desired.

"Weather proof paint #1A, oil base"

Refined linseed or refined China-wood oil
_____ gallons__ 1
Copal white gum according to thickness
of the varnish desired _____ pounds__ 1.5-2.0

The above ingredients are boiled and melted to form a varnish.

Instead of the above varnish, a flat or gloss commercial outside spar varnish may be used.

One of the above described varnishes _____ 3/20 (15%) gal.
Glycerine _____ 1/20 (5%) gal.

These are thoroughly mixed. Then take

"Fire stop pigment #2" _____ pounds__ 7 and mix part of this pigment #2 with the varnish, enough to give a paste. Then take "Fire stop vehicle #2, clear" ____ 16/20 (80%) gal.

and mix thoroughly with this vehicle #2, clear. Then the remainder of the 7 lbs. of pigment #2 is added, to give "Weather proof paint #1, oil base." This paint has fire resisting and moisture resisting qualities, but preferably it is applied to the sealing coat, which in turn is applied over two coats of "Fire stop paint #1," already described. This paint is put through a 200 mesh screen before packaging.

"Weather proof paint #2A, oil base"

Glycerine _____ 1/20 (5%) gal.
"Fire stop vehicle #2 clear" _____ 3/20 (15%) gal.

These are well mixed. Then take

"Fire stop pigment #2" _____ pounds__ 7 and mix part of this pigment with the mixed glycerine and vehicle, to give a paste. Then take a varnish made of copal white gum and refined linseed or China-wood oil, as in the preceding example, or a commercial outside flat or gloss spar varnish (according to the finish desired):

Varnish as just described _____ 16/20 (80%) gal.

and mix gradually and thoroughly with the above paste. Then gradually and thoroughly mix in the remainder of the pigment #2. This gives "Weather proof paint #2A, oil base." It is also fire resisting. It is put through a 200 mesh screen before packaging or storage. It is applied over the described coat of "Weather proof paint #1A, oil base." Before using, a suitable amount of a liquid drier should be added.

Comparing the two foregoing oil base paints, it will be noticed that the amounts of varnish and vehicle are reversed. In the first oil base paint, the varnish is to vehicle as 3:16. In the second, the varnish is to vehicle as 16:3.

Vegetable pigments as well as mineral pigments can be used in the weather or moisture proof paints, as desired.

White or light colored paint

"Fire stop pigment #2" _____ pounds __ 25
Linseed or China-wood oil _____ gallons __ 2–2¼

These are thoroughly mixed in a suitable mixer to give a "damp" feeling mixture. Then take "Fire stop pigment #2" plus oil, as just
  described _____ pounds __ About 25
"Fire stop vehicle #2 clear" _____ gallons __ 3

These are thoroughly mixed, to give a fire resisting white paint.

Priming or sizing coat for metal surfaces

A priming coat, while not necessary, is desirable.

"Fire stop vehicle #1" _____ gallons __ 1
Pigment #3, mica, 250 mesh _____ pounds __ 1
Pigment #4, mica, 100 mesh _____ do ____ 1

These are thoroughly mixed in a suitable mixer or mill, and in use gives a slightly rough priming coat, due to the coarser mica particles, useful in causing adherence of the first coat of "Fire stop paint #1."

Priming or sizing coat for wood, paper and similar surfaces

For softer surfaces, such as wood, paper and the like, a suitable primer is made as described above, except that "Fire stop vehicle #1" is well mixed with 25% of boiling water before mixing with the pigments.

While two weather proof paints, lacquer base, have been described, and two weather proof paints, oil base, have been described, as applied in a certain order, it should be understood that these paints may be applied in any suitable order, in accordance with the desired results.

Summary

For complete fire proof and moisture proof protection, the following steps are preferred:

1. A priming or sizing coat is applied, using the appropriate priming for metal or wood surfaces, as desired.

2. Apply a first coat of "Fire stop paint #1," allowing about 2 or 3 hours to dry.

3. Apply a second coat of "Fire stop paint #1," allowing about 4 hours to dry. This gives a fire stopping protection suitable for indoor use. However, for outdoor use:—

4. Apply a sealing coat of gum lacquer dissolved in alcohol, as described. This insulates the fire stop paint from the moisture proof paint and prevents possible chemical interaction between the two.

5. Apply a first coat of "Moisture proof paint #1," either lacquer or oil base, allowing it to dry several hours.

6. Apply a second coat of "Moisture proof paint #2 or 2A," lacquer or oil base.

With the successive layers as described, there is a gradual change in composition, from an innermost fire proofing layer next to the wood or metal, outwardly to the outermost layer, which, while fire resistant, is essentially a moisture proofing layer.

While the preferred ingredients of the improved paint have been described in detail, it should be understood that equivalents of the named ingredients, apparent to those skilled in the art, may be used.

While particular and preferred ingredients have been specified, it should be understood that equivalents of the named substances may be used and that some may be omitted. The named ingredients have been selected and tested, not only to avoid undesirable chemical interaction between the ingredients, but also at the same time to provide the necessary fire proofing and water proofing properties. While particular proportions have been specified, it should be understood that these may be varied, as is well understood by those skilled in the art.

I claim as my invention:

1. The process of preparing a fire-resisting paint, comprising the steps of mixing about one-quarter gallon of glycerine and about three-quarters gallon of nitrocellulose base lacquer with sufficient finely divided asbestos to form a paste; mixing this paste with about twelve gallons of a water solution of sodium silicate, thereby forming a vehicle; then intermixing with said vehicle about 108 pounds of inert mineral pigments mixed with about two gallons of a drying oil.

2. The process of preparing a fire-resisting paint, comprising the steps of mixing about one-quarter gallon of glycerine and about three-quarters gallon of nitrocellulose base lacquer with sufficient dust asbestos to form a paste, mixing this paste with about 12 gallons of a water solution of sodium silicate; allowing this mixture to settle for several days; drawing off the upper, clear portion, thereby providing a clear vehicle; then intermixing about 108 pounds of inert mineral pigments mixed with a drying oil, with said clear vehicle.

3. The process of preparing a vehicle for a fire-resisting paint, comprising the steps of mixing about one-quarter gallon of glycerine and about three-quarters gallon of nitrocellulose base lacquer with enough dust asbestos to form a paste; then adding about 12 gallons of a water solution of sodium silicate.

4. The process of preparing a vehicle for a fire-resisting paint, comprising the steps of mixing about one-quarter gallon of glycerine and about three-quarters gallon of nitrocellulose base lacquer with enough dust asbestos to form a paste; then adding about 12 gallons of a water solution of sodium silicate, allowing the mixture to settle for about two days, and then separating the upper, clear liquid as the desired vehicle.

5. A fire resisting paint, consisting of approximately the following ingredients, mixed and blended into a smooth homogeneous suspension:

Water solution of sodium silicate ___ gallons __ 12
Glycerine _____ do ____ ¼
Nitrocellulose base lacquer _____ do ____ ¾
Mixture of inert mineral pigments __ pounds __ 108
Drying oil _____ gallons __ 2

6. A vehicle for a fire resisting paint, consisting of approximately the following ingredients, mixed and blended into a smooth homogeneous suspension:

|  | Gallons |
|---|---|
| Water solution of sodium silicate | 12 |
| Glycerine | ¼ |
| Nitrocellulose base lacquer | ¾ |

Dust asbestos, sufficient to form a paste with the glycerine and lacquer.

7. A clear vehicle for a fire resisting paint, consisting of approximately the following ingredients, mixed and blended into a smooth homogeneous suspension:

| | Gallons |
|---|---|
| Water solution of sodium silicate | 12 |
| Glycerine | ¼ |
| Nitrocellulose base lacquer | ¾ |

ORAZIO LA CAGNINA.

REFERENCES CITED

The following references are of record in the file of this patent:

UNITED STATES PATENTS

| Number | Name | Date |
|---|---|---|
| 328,857 | Miller | Oct. 20, 1885 |
| 459,751 | Hooker | Sept. 22, 1891 |
| 780,001 | Hall | Jan. 10, 1905 |
| 1,234,816 | Strickle | July 31, 1917 |
| 1,397,028 | Wortelmann | Nov. 15, 1921 |
| 1,436,618 | Welles | Nov. 21, 1922 |
| 1,647,666 | Rogers | Nov. 1, 1927 |
| 1,830,906 | Jaeger | Nov. 10, 1931 |
| 2,084,486 | Flood et al. | June 22, 1937 |
| 2,125,951 | Parry | Aug. 9, 1938 |
| 2,350,161 | Gloor | May 30, 1944 |

FOREIGN PATENTS

| Number | Country | Date |
|---|---|---|
| 6,755 | Great Britain | 1907 |
| 76,328 | Germany | 1894 |
| 318,696 | Great Britain | 1929 |
| 466,313 | Great Britain | 1937 |
| 473,516 | Great Britain | 1937 |